United States Patent [19]

Olson

[11] Patent Number: 5,011,189

[45] Date of Patent: Apr. 30, 1991

[54] PUBLICATION REFERENCE-AID SYSTEM APPARATUS THEREFOR

[76] Inventor: Craig W. Olson, P.O. Box 302, Fontana on Geneva Lake, Wis. 53125

[21] Appl. No.: 388,319

[22] Filed: Jul. 31, 1989

Related U.S. Application Data

[63] Continuation-in-part of Ser. No. 147,366, Jan. 25, 1988, abandoned, which is a continuation-in-part of Ser. No. 940,422, Dec. 11, 1986, abandoned.

[51] Int. Cl.[5] ........................ B42D 15/00; B42D 1/00; B42F 21/00; B32B 5/16

[52] U.S. Cl. ........................................ 283/81; 281/3.1; 283/42; 428/327

[58] Field of Search ........................ 283/74, 81, 42, 39, 283/36; 281/3 R, 15 R, 34, 42, 3.1; 40/20 R; 428/28, 38, 40; 156/4

[56] References Cited

U.S. PATENT DOCUMENTS

| | | | |
|---|---|---|---|
| 3,290,059 | 12/1966 | Newman | 281/3 R |
| 3,582,111 | 6/1971 | Siiter | 281/3 R |
| 3,958,816 | 5/1976 | Remmey, III | 283/42 |
| 4,235,459 | 11/1980 | Callahan | 283/81 |
| 4,329,191 | 5/1982 | Barber | 156/64 |
| 4,500,021 | 2/1985 | Bildusas | 428/40 |
| 4,580,815 | 4/1986 | Barber | 283/81 |
| 4,614,361 | 9/1986 | Foster | 283/81 |
| 4,636,432 | 1/1987 | Shibano et al. | 428/327 |
| 4,643,455 | 2/1987 | North et al. | 283/81 |
| 4,752,087 | 6/1988 | Weisbach | 283/81 |

*Primary Examiner*—Douglas D. Watts
*Assistant Examiner*—Paul M. Heyrana, Sr.

[57] ABSTRACT

An improved reference-aid apparatus and system for publications, a production-assembled apparatus included with the publication at the time of manufacture, adapted to be separably removable from the publication and mountable thereon by a user, double-faced apparatus (10) comprised of the mountable directory (34) and markers (11,18) constructed from at least one flexible sheet are formed by at least one separable line (24,25,26). The information means area (12,13; 19,20; 36,37) occupies substantially one face of each member; the attaching means area portion comprised of at least one attaching means area, the sum total attaching means area is from about 2% to about 99.9% overlies the information means area beneath, the attaching means area portion occupied by the substantially transparent and inferior adhesive (16,22) permitting the apparatus members to be remountable repeatedly being adapted to be colored. The multiple-faced releasably protective covering means (15,21) is without a release coating means, intermittently severed and adapted to be imprinted on at least one face overlies the adhesive beneath, at least one edge of the covering extends beyond the adhesive beneath to facilitate removal of the covering. The marker (11,18) mounted to the outside margin extending beyond and overlying the publication edge. A separably mountable directory (34) mounting to the publication panel, one information area having at least one inscribable entry area portion comprised of at least one inscribable entry area identified by an adjacent identification indicia reciprocally corresponding in "cross-matched" cooperation with each other, each matched sets being variated to differentiate groups of "like" indicia from each other.

14 Claims, 6 Drawing Sheets

PUBLICATION REFERENCE-AID SYSTEM APPARATUS THEREFOR

CROSS-REFERENCE TO RELATED APPLICATIONS

This application is a continuation-in-part of Ser. No. 07/147,366, filed Jan. 25, 1988, now abandoned, which was a continuation-in-part of parent application Ser. No. 06/940,422, filed Dec. 11, 1986, now abandoned.

FIELD OF THE INVENTION

The field of this invention lies within the art of reference-aid devices. More particularly, this invention is an improved and economically fabricated reference-aid as a "production-assembled" apparatus which is incorporated as a part of various types of publications at the time of manufacture, being separably removable and mountable by a user thereon, for accessing and retrieving information and/or material contained within a desired publication.

BACKGROUND OF THE INVENTION

The Information Age has produced a glut of information which is an important cataloging concern not only to librarians but to students, teachers, business and professional people, as well as general readers alike who gather and store various types of publications, such as, periodicals, music record albums, compact and floppy discs including coin and stamp collection materials. For example, in the case of periodical publications like magazines, journals, digests, mail order catalogs, etc., the constant flow of information can stack and pile up in a rather short period of time, resulting in severe mental anguish in relocating poorly marked reference sources, if at all. For this reason, publishers of some publications provide outside cover information, table of contents and seldomly an index at the close. This results in an amount of information which is necessarily associated with a reader-user but inconsistently possible to store collectively in a systematic and uniform manner and therefore discarded early or lost.

Reference markers are customarily packaged in different quantities which may include combinations of colors, and various shapes and sizes. Although in the past, loose single sheets have been inserted between the pages at the gutter margin to indicate reading passage locations. Other unorthodox methods commonly used consist of "dog-eared" page corners, inscribing the text portion or highlighting lines, if a marker is convenient, all of which are detrimental to the preservation and conservation of reference material according to the American Library Association.

Publication products are often subscribed to due to special interests which further add to the accelerated flow of personally needed information. Understandably, the systematic organization associated with the publication product becomes of secondary importance under these conditions. Thus, it is not uncommon for information as to the date of publication, issue number, special articles of interest, important statements, etc.—to go unmarked or be missing entirely from the dusty collection of publications due to the fact that it is not apparent to the user-reader the material may be only misfiled.

As a result, much inconvenience and wasted time is encountered by the researcher-user whose ability to access and retrieve needed information is dramatically inhibited forcing the researcher to a subsequent course of action for which he may regret that is due to his dependency, in part, on the necessary information unable to be produced upon demand. Not only is this undesirable from a researcher's point of view, but also from that of the user who is interested in managing his vast publication collections for inventory control purposes since the documentation may be very sketchy.

Unfortunately, until the present invention, the burden of developing and establishing some organized and systematic method of accessing and retrieving information lay individually in the initiative of the researcher-user to incorporate his own suitable technique in practice.

Examples of prior art relating to indexing devices is both historical and crowded as indicated by the following patents known to applicant. A continued search was conducted in the U.S. Patent Office, prior to filing this application, for the most recent patents issued within the following Classes/Subclasses: 283/35-42; 40/78; 40/2; 35/35 R; 35/43; 116/119 and 428/42. Cited references are those found to be most pertinent within the foregoing classes of study.

| | | |
|---|---|---|
| 4,696,491 | Stenger | 1987 |
| 4,680,210 | Corcoran | 1987 |
| 4,596,407 | Suska | 1986 |
| 4,437,685 | Valencia | 1984 |
| 4,019,759 | Stanton | 1977 |
| 3,968,816 | Remmey | 1976 |
| 3,680,229 | Serrie et al. | 1972 |
| 3,583,358 | Hanson | 1971 |
| 3,561,147 | Valencia | 1971 |
| 3,535,804 | Cunningham | 1970 |
| 3,473,827 | Leadbetter | 1969 |
| 3,463,515 | Thompson | 1969 |
| 3,324,823 | Peters | 1967 |
| 2,590,615 | Heckendorn | 1952 |
| 2,314,578 | Erb | 1943 |

U.S. Pat. Nos. 4,696,491; 4,680,210; 4,596,407; and 4,437,685 constitutes the most advanced developments with which the present invention is concerned.

Stenger and Suska both disclose an information retrieval system each employing the use of loose-leaf binders. Stenger discloses an information indexing system for a recipe reference book whereby a supply of preprinted abstract pages found in a separate appendix section are selected and removed for placement among a plurality of alphabetic sections. Suska disclosure was cited for its merits in periodical storage and retrieval, where Suska claims and illustrates a duplicate index page to be constructed with the periodical adapted to be removed for separate storage in a loose-leaf binder. Both patents do not teach the present invention which is a "production-assembled" apparatus separably removable from a publication and mountable thereon by the user nor the use of adhesive bearing a releasable protective covering.

In U.S. Pat. No. 4,680,210, Corcoran discloses repositionable markers having a laminated liner on one face, the markers manufactured as a generic stationary product and positioned in intermeshed pairs having alternation orientation on adhesive strips. This disclosure does not teach markers having intermittently severed coverings nor a "cross-matched" reciprocal arrangement between markers and a mountable directory; further the directional markers taught are not included with a publication during manufacture. Therefore, this disclosure is not the same as the present invention.

U.S. Pat. Nos. 4,437,685 and 4,019,759, Valencia and Stanton, respectively, disclose indexing devices for reference directories. Valencia teaches a novel book index marker device which is inserted between the pages of a book with the indexing indicia disposed above and below the top and bottom edges of the book being secured in place by an elastic band extending externally of the spine of the book. Stanton also discloses a version of an index device employing the use of elongated flat transparent plastic index tabs, each being affixed by a strip of transparent adhesive tape. Both indexing devices and securement used in each are not the same as the present invention in this respect nor are they "production-assembled" with a publication during manufacture.

In U.S. Pat. No. 3,958,816 Remmey teaches notation related book markers which use learning key cards that relate to the tabs, the tabs corresponding to key cards stored in a mountable envelope jacket mounted to the inside of a book; the envelope holding unused tabs detachable therefrom. Further, Remmey teaches the markers having identification marks in opposite directions and that both the adhesive area and identification mark area each occupy one-half of the tab, each area being a substantially square area. Other numerous distinguishable differences lie between the Remmey disclosure and the present invention. Remmey teaches an "after-market" product and does not disclose a "production-assembled" apparatus temporarily secured with a publication during manufacture. Further, he does not teach a releasable protective covering (without a release coating) being intermittently severed, a substantially transparent adhesive adapted to be colored, an attaching area having a sum total of from about 2% to about 99.9% overlying the information area occupying substantially one face, nor a separably removable and mountable directory mountable to the outside panel of a publication, to recap a few variances untaught by Remmey.

In U.S. Pat. No. 3,680,229 Serrie et al, discloses a reading level apparatus having matched symbols of two series using a permanent adhesive on one face, indicating a level of student reading ability and a level of book reading difficulty. The disclosure does not teach a temporarily secured convenient reference-aid assembled with a publication during manufacture readily adapted to be separably removed from a publication and mountable thereon by a user. Further, an information area is not taught to comprise both faces of the apparatus members, nor is the use of a substantially transparent adhesive adapted to be colored which are disclosed in the present invention.

U.S. Pat. No. 3,583,358 shows an assembly of marker tabs separably removable from a matchbook-like holder for marking pages of a book. Hanson does not teach the use of a separably removable and mountable directory corresponding to markers, nor does he disclose an apparatus temporarily secured as a part of a publication during manufacture as taught by the present invention.

U.S. Pat. No. 3,561,147 is cited as an example of a book index prefabricated as an insert leaf adapted to mount between the leaves of a reference directory which has an outwardly folded tongue reversely folded and threaded through an appropriate precut slit to provide a triple ply tab. Valencia does not disclose an apparatus separably removable from temporary securement and adhesively mounted on a publication, nor is the use of a separably mountable directory discussed. Valencia does not teach the present invention.

In U.S. Pat. No. 3,535,804 Cunningham shows a page-edge reinforcing device and method of mounting to a "thin" directory page, where successive adjacent tabs are displaced serially when the apparatus is mounted on appropriate pages of a book longitudinally in alignment with the edge. This patent does not discuss the use of at least two "cross-matching" indicia corresponding with a mountable directory. The objects and functions are different than those of the present invention.

Leadbetter, in U.S. Pat. No. 3,473,827, illustrates a permanently mounted directory with separably connected index tabs to the body of a page of a book, the tabs being a folding type with transverse fold lines on the rectangular tabs intermediate their length. Leadbetter does not disclose the present invention which has identification areas on both faces of the markers, an apparatus which is temporarily secured with a publication—including a separably removable directory for mounting thereon, machine readable indicia to be accepted, an intermittently severed releasable covering adapted to be imprinted on at least one face nor a substantially transparent adhesive adapted to be colored.

U.S. Pat. No. 3,463,515 was selected for showing another indexing device of transparent material having a disc-shape and transparent adhesive, and utilizing an identification character on each tab for facilitating alignment with each other. The indexing apparatus disclosed is not the same as the present invention, further, no intermittently severed releasable protective covering is discussed nor is the system taught to be included during manufacturing of a publication.

U.S. Pat. No. 3,324,823 illustrates Peters disclosing an earlier version of U.S. Pat. No. 4,437,685 (1984) issued to Valencia wherein a book mark device comprising a plurality of markers, being not less than substantially the same size as a page of a book and having a tab portion opposite the inserted edge, is inserted between adjacent pages of a book into the gutter and banded by a resilient member extending around the pages adjacent the spine. This disclosure, being more closely related and similar to Valencia, however, is distinctly different from the numerous accomplishments which the present invention employs.

Heckendorn in U.S. Pat. No. 2,590,615 was selected for showing a removable page and bookmark having a formed tab with friction material at the point adapted to wedge the bookmark between the leaves of a book, to secure the book mark in position. Heckendorn does not teach the present invention having removably mountable apparatus members for mounting to a pagingated or non-paginated publication.

In U.S. Pat. No. 2,314,578 Erb discloses a pair or pairs of co-acting index tabs being permanently secured by moistened adhesive or by a strip of "Scotch" tape being severed to remove the tab from the page. Erb does not discuss utilizing an intermittently severed releasable protective covering, being adapted to be imprinted on at least one face, substantially transparent adhesive adapted to be colored, nor the employment of reciprocally cooperating "cross-matched" identification indicia corresponding to a mountable directory having "like" identification indicia. This indexing device is not the same as the present invention.

No prior art disclosures suggest the accomplishments of the present invention.

SUMMARY OF THE INVENTION

The improved apparatus of the invention consists of three separably removable and mountable component members initiating a systematic approach to retrieve various types of paginated publications; a modified system apparatus having selected component members designed for non-paginated publications, such as music record albums, compact discs, cassette tapes, etc. The invention is created from double-faced sheet stock which incorporates at least one separable line, like perforations, tear lines, intermittently severed lines, etc. which are used to form (by outlining) the apparatus members consisting of (a) one primary marker; (b) subordinate (secondary) markers; and (c) one mountable directory. The apparatus is a production-assembled product, included with the publication at the time of manufacture and is a convenient reference-aid, temporarily secured to a publication prior to being separated and removed therefrom and used thereon by the reviewer-user of the information. The apparatus may be enclosed freely or attached by at least one separable line to prevent loss during distribution and transit. Other basic elements required and utilized include a preferred releasable and reusable type adhesive substance having a substantially transparent property overlayed with a releasable protective covering which extends beyond the adhesive substance beneath to facilitate removal of the covering from the adhesive; the covering is adapted to be imprinted on at least one side and is capable of being peeled away from only the adhesive on the desired apparatus member to be employed. The markers selected are mounted to the outside margin of the corresponding publication means with a portion extending beyond and overlying the edge.

The main (primary) marker member bears the information means area occupying substantially each face (front and rear) thereof. In addition, the information means area may employ identification indicia, preferably located on the marker portion (head) which extends beyond and overlies the edge, assigned to identify the publication for rapid referencing and inventory control purposes that may be of a visual and/or machine readable type, perhaps like an optically scannable bar-code for example. The visual information, such as the publication title, issue date, volume number, etc. may appear adjacent the machine readable information. The machine readable information permits instruments, such as a laser wand, to send information to the computer for the reason of enacting a particular function. The easily accessible information on the extended portion of the marker eliminates the removal of any publication means from its position in storage. The present invention has at least one information means area of the apparatus adapted to accept a machine readable identification indicia. Further, the one face (front) of the (primary) marker is occupied substantially by the information means area, permitting many forms of information to be utilized such as advertising, inscribable directories, publication information, multiple identification indicia and the like. The opposite one face (rear) has an attaching means area portion which is occupied by the substantially transparent substance which overlies the information means area that occupies substantially one face of the apparatus member. Should multiple inscribable entry areas be required, the adjacent identification indicia indicating a particular entry area or areas may be variated to differentiate designated areas from one another. In this variation of the apparatus, with the directory being a part of the main (primary) marker, the need for a separately mountable "non-marker" directory would be eliminated. Each individual apparatus member may be temporarily secured with the publication at the time of manufacture without the need and cooperation of the other members.

Each cooperating identification indicia on the directory employed may have at least one corresponding inscribable entry area or (secondary) marker bearing the "like" matched indicia, the "like" indicia cooperating in reciprocal "cross-matching" relationship to the directory or perhaps each other. The inscribable entry area portion on the directory is provided for hand written notations of "general" subjects, articles of interest while the markers (secondary) are for notations of more specific information to be indicated on the information means area, both for assisting in future review of the publication material.

Similarly, the double-faced subordinate (secondary) markers have the information means area occupying substantially one face of each side of the marker or markers. One face has the attaching means area portion occupied by a releasable and reusable substantially transparent adhesive means which overlies the information area, permitting the information imprinted on the face of the sheet stock beneath to be displayed and visibly readable. Overlying the adhesive substance, permanently attached to the one face of the apparatus, is a releasably protective covering means adapted to be imprinted on at least one side and further, is intermittently severed by separable lines that are applied to the apparatus allowing complete separation of the individual markers and/or members comprising the apparatus. The covering means extends beyond the adhesive means beneath to facilitate removal of the covering means from the adhesive means.

The information means area of the secondary marker faces is provided to receive many forms of information, for example, trademarks, identification information, color-codes, optically scannable codes; multiple-coding; as well as an inscribable entry area for personal hand-written notations of targeted information. Each cooperating inscribable entry area and/or marker employing the identification indicia of a "like" kind corresponds to other apparatus members having the same or "like" kind of identification indicia participates in a "cross-matching" predetermined associative relationship. The number of matched sets of indicia and participating apparatus members to be employed depends on the designer of the apparatus. It is important to note, one or more subordinate marker members may correspond to at least one "cross-matching" inscribable entry area or areas located on the information means area of the directory, or any other apparatus member. At least two "like" identification means indicia comprise a matched set allowing the "like" identification means indicia to reciprocally correspond in "cross-matched" cooperation with each other, each of the matched sets of the identification means indicia being variated to differentiate groups of "like" identification means indicia from each other to aid the user during review of material.

The preferred marker shape may be substantially rectangular for simplicity sake in practice, however more creative configurations, perhaps more practical, may be utilized by the designer at will and still remain in keeping with the present invention, such as geometric, modified-geometric or perhaps irregular design shaped markers which also encompasses the mountable directory apparatus member to be designed. The mind is the only limiting factor with respect to possibilities of the present invention. Usually the information imprinted on both faces of a particular apparatus member would be variated due to advertising and/or information requirement needs. However, in some instances, the multiple usage of information on both faces of the desired apparatus member may need to be employed, where it is appropriate to utilize identical indicia, advertising, etc., back-to-back. In addition, miscellaneous information may be incorporated on the information means area, such as prize winning games, instructions, directions, additional advertising space (under the substantially transparent adhesive) and the like. The total apparatus or just the selected members employed may serve as an advertising medium and/or premium item when included with a publication means at the time of manufacture and temporarily secured therewith to be separably removable by the recipient-user of the material.

The third apparatus member is the separably removable and mountable directory, a non-marker member of the apparatus, also constructed from sheet stock remote from the markers. This apparatus member, employed at the option of the designer, is also temporarily secured with the publication at the time of manufacture, making separation and removal therefrom convenient and simple by the user. The mounting directory is a substantial improvement over prior art being formed by at least one separable line from sheet stock. One face of the mountable directory member is occupied substantially by the information means area having at least one inscribable entry area portion overlying the information means area. In this portion, each cooperating entry area is identified by an adjacent identification indicia distinguishing one entry area from another. The matched sets of at least two identification means indicia have reciprocal "cross-matching" cooperation with matched indicia imprinted on at least one cooperating marker, if any are employed, or to other inscribable entry areas designated by a "like" indicia. The opposite one face (rear) of the mountable directory has an attaching means area portion which overlies the information means area that substantially occupies the one face. The attaching means portion is occupied by a substantially transparent adhesive substance overlied with a releasable protective covering extending beyond the adhesive beneath to facilitate removal of the covering from the adhesive means; the releasably protective covering is adapted to be imprinted on at least one face of the multiple-faced covering means. The mountable directory may be used in conjunction with or separately from the other apparatus members and is designed to be mounted by a user to a convenient place upon the publication—preferably to the exterior cover panel or the perhaps mounted to a page adjacent the index page or table of contents, should one be provided, serving as to complement. Further, the information area of the directory may employ machine readable identification indicia adjacent the selected inscribable entry areas, for computer interfacing purposes and information storage and retrieval.

Since each apparatus member may also be employed independently of one another, at least one apparatus member is constructed from at least one sheet of flexible material and at least one separable line means forms the apparatus from the sheet stock. Further, at least one apparatus member is included as a convenient reference-aid with the publication means during the time of manufacture and, where the apparatus is readily adapted to be separably removable from the publication means and mountable thereon by the user. The apparatus may utilize various size sheets of stock depending on the need felt. For instance, a paginated publication, where the apparatus is being arranged for use in periodicals (magazine), the apparatus may be temporarily secured by being held between adjacent pages, integrally formed from a page to be collated with the publication or be separably removable from a gate fold panel portion by separable lines or any other form of an insert to be used therewith. The present invention may be temporarily secured to a paginated publication by being saddle-stitched (stitched with staples), perfectly bound (glued in) or otherwise to the spine area of the article. Whatever desirous means of including the apparatus with a publication means at the time of manufacture is another detail left to the descrection of the designer, etc., so long as the apparatus is separably removable from the publication means by a user.

As aforementioned, depending upon the kind of publication involved, the apparatus may consist of the markers (primary and secondary type) and the removably mountable directory making referencing and inventory control significantly easier by the researcher-user. The apparatus is designed for complete personalization to reapidly retrieve and access information upon demand. Both the markers and mountable directory may define designated areas for writing brief notations, and the apparatus members are individually remountable without being detrimental or harmful to the material comprising a particular publication. The adhesive substance used is substantially transparent (see-through) and is permanently mounted on the face of the apparatus members in a desired attaching means area portion overlying the information means area. The attaching means area portion may be occupied by at least one attaching means area and further may occupy less than or greater than one-half of the information means area on one face of the marker. Decorative adhesive images may also be used in the application of the adhesive, such as trademarks, various object shapes, and the like with the intermittently severed cover overlayed thereon.

The product of the invention may be laminated, either partially or entirely on desired areas of the apparatus face. The latest paper construction on the market today provides an innovative laminant stock where the reinforcing film is sandwiched between two outside paper layers—an excellent application for use with the present invention providing greater product longevity.

The preferred adhesive is an releasable and reusable adhesive layer means substance similar to POST-IT Note Brand adhesive being pressure sensitive and permanently affixed to one face of each apparatus member permitting each individual mounted apparatus member to be remountable repeatedly. Further, an adhesive substance which will not ooze beyond a designated attaching means area to contact contiguous objects, cause discoloration or leave harmful residue on the publication material upon removal of the apparatus members. Further, the reusable adhesive has a special property in that it is substantially transparent (see-through) and is adaptable to be attractively colored to provide visually appealing aesthetics with the graphics displayed beneath on the face of the apparatus. The application of the substantially transparent adhesive overlying the information means area, enhances the function of the apparatus over prior art, permitting games, such as prize winning lottery numbers, etc. to "surprise" covering is peeled away revealing the concealed information beneath. The sum total of the attaching means area may occupy from about 2% to about 99.9% of the information means area of each apparatus members one face.

The intermittently severed releasably protective covering means is without the use of a release film, layer, laminant liner, liner, or any form of release coating means applied thereto; yet is adapted to be imprinted on at least one face—being made of such material as offset stock, calendered stock, cellophane, mylar, teflon films, plastic, etc. to cover the adhesive beneath. At least one edge of the releasably protective covering extends beyond the adhesive to facilitate removal of the covering means from the adhesive substance beneath, the "inferior" adhesive substance being permanently applied on the attaching (affixing) means area portion which overlies the information means area on one face of the apparatus member. The covering could also be of a transparent, translucent or opaque type depending upon the designers intent for a custom apparatus. Several methods are available, in the alternative, to fabricate the apparatus with an intermittently severed covering. The covering means (bearing the adhesive on one face) may be severed concurrently with the apparatus during fabrication. In the alternative, the adhesive may be applied, first, to the apparatus followed by the application of one or more intermittently severed releasable protective covering means. The severations in alignment with each desired separable line of the apparatus member to allow complete separation of the selected apparatus members. The protective covering means may be applied as a single intermittently severed tape-like form or individually applied to the required adhesive occupied portions. As a note, the attaching (affixing) means area portion consists of at least one attaching means area and, at least one attaching means area is overlayed with a severed covering means.

The separably removable and mountable directory is occupied substantially on each face by the information means area. One face of the directory member has the inscribable entry area portion overlying thereon, the inscribable entry area portion having at least one cooperating inscribable entry area identified by an adjacent identification means indicia. The identification indicia employed may be variated to differentiate unrelated entry areas from one another and groups of "like" identification indicia from each other. The directory is provided with at least one inscribable entry area in which to place hand-written notations of "general" interest, for later review, i.e., articles, titles, songs, etc. The corresponding "cross-matched" markers may have an entry area to identify more specific and brief notes, i.e., columns numbers, paragraphs and line numbers, etc. In the alternative, the directory may be provided on the face of one marker (the primary marker is preferred for this purpose), if desired. The apparatus may also include subordinate (secondary) markers, if elected to be used, which may correspond to the directory identification indicia adjacent the cooperating inscribable entry areas. At least one information means area of the apparatus is adaptable to accept machine readable identification indicia.

The apparatus may consist of at least one marker which may accompany a publication depending on its type and/or function. In the case of an individual plastic dust cover container for a compact disc publication, only a single marker may be required containing a machine readable identification indicia, such as a bar-code, for inventory purposes. First, the apparatus is removed by the recipient-user from the product packaging and then mounted to a desired position on an outside margin of the dust-cover container with the marker portion (bearing the code) extending beyond the edge of the container. A series of publications of a similar type may be stored juxtaposed, each having a marker extending and mounted systematically in a staggered, consecutive or other formation pattern order employed. This provides easy accessibility to the filed or misfiled publications at a glance or for instance, using a laser wand to readily scan each bar-code extending therefrom without having to remove each publication individually from its filed position. The laser wand is connected to a computer which in turn brings up the cataloged or "to be cataloged" information screen for identifying the publication which is then capable of being printed out. It is with the present invention that retrieval of various publication information is expedited and inventory control maintained.

The information means area which occupies substantially one face of each double-faced apparatus members may include advertising, trademarks, service marks, slogans, information, directions on "how-to", prize winning games, etc. including identification indicia having many forms. One stipulation is that at least one indicia employed is machine readable—mechanically, magnetically, electrically or otherwise. The information can be arranged with endless formats and layout designs at the descretion of the designer of the apparatus, taylor-made suitable for the appropriate need.

The apparatus may be made available as an "aftermarket" stationary product, packaged in various quantities, for the user to purchase to "retro-index" back issues of publications requiring the reference-aid system of the present invention.

One object of the invention is the provision of a publication reference-aid system apparatus as a "production-assembled" product temporarily secured with a publication article during the time of manufacture, the apparatus comprising a removably mountable directory member and/or at least one marker, the apparatus members being of double-faced sheet stock formed by at least one separable line means from insert supplements or from sheet stock membering the publication, each apparatus member having one face having the information means area, the opposite one face having the information means area having the attaching means area portion overlying thereon, the attaching means area portion occupied by adhesive means having a releasably protective covering means overlying the adhesive means beneath, the marker mounting to the outside margin of the publication means extending beyond and overlying the edge, a separably removable and mountable directory for mounting the directory on the publication means remote from the marker mounted to the same publication means, one face of the directory having the information means area and the inscribable entry area portion overlying thereon having identification means indicia and the opposite one face having the information means area having the attaching means area portion overlying thereon, the attaching means area portion occupied by adhesive means having a releasably protective covering means overlying the adhesive beneath, the apparatus and use to facilitate accessing and retrieving information found in in the publication means.

Another object of this invention is the provision of a publication reference-aid system apparatus wherein at least one apparatus member is constructed from at least one sheet means, wherein at least one separable line forms the apparatus from the sheet, wherein at least one apparatus member is temporarily secured as a convenient reference-aid with the publication means during the time of manufacture, wherein the apparatus is readily adapted to be separably removable from the publication and mountable thereon by a user.

A further object of this invention is the provision of a publication reference-aid system apparatus comprising at least one information means area of the apparatus having at least one identification means indicia, wherein one face of the apparatus member is occupied substantially by the information means area having the attaching means area portion overlying thereon occupied by the adhesive means.

Another object of this invention is the provision of a publication reference-aid system apparatus wherein the adhesive is inferior permitting the apparatus members to be remountable repeatedly, wherein the adhesive is substantially transparent permitting the information area beneath to be displayed and visual.

Still another object of this invention is the provision of a publication reference-aid system apparatus wherein the substantially transparent adhesive is adapted to be colored.

Another object of this invention is the provision of a publication reference-aid system apparatus wherein the releasably protective covering means is intermittently severed to allow complete separation of the apparatus members permitting individual removal of the selected members, wherein at least one edge of the covering means extends beyond the adhesive means beneath to facilitate removal of the covering means from the adhesive means.

Another further object of this invention is the provision of a publication reference-aid system apparatus wherein the protective covering means is integrally formed from and hingedly connected to the sheet means comprising the apparatus being folded over along a foldable line, releasably adjoining the inferior adhesive to facilitate the application of the covering means.

A further object of this invention is the provision of a publication reference-aid system apparatus wherein the releasably protective covering means is multiple-faced and is adapted to be imprinted on at least one face, wherein the covering means is without the use of a releasable coating means applied to the faces.

Still a further object of this invention is the provision of a publication reference-aid system apparatus wherein the attaching means area portion is comprised of at least one attaching means area, and wherein the sum total of the attaching means area is from about 2% to about 99.9% of the information means area, wherein at least one attaching means area is overlayed with the releasably protective covering means, wherein the attaching means area is decorated with at least one adhesive image.

Still another further object of this invention is the provision of a publication reference-aid system apparatus wherein one face of the separably removable and mountable directory is occupied substantially by the information means area having the inscribable entry area portion overlying thereon, wherein the opposite one face is occupied substantially by the information means area having the attaching means area portion overlying thereon occupied by the adhesive.

Another further object of this invention is the provision of a publication reference-aid system apparatus wherein the inscribable entry area portion is comprised of at least one inscribable entry area, and wherein each cooperating inscribable entry area is identified by an adjacent identification means indicia.

Yet a further object of this invention is the provision of a publication reference-aid system apparatus wherein at least two "like" identification means indicia comprise a matched set allowing the "like" identification means indicia to reciprocally correspond in "cross-matched" cooperation with each other, wherein each of the matched set of the identification means indicia being variated to differentiate groups of "like" identification means indicia from each other.

Still yet a further object of this invention is the provision of a publication reference-aid system apparatus wherein the information means area is comprised of at least one inscribable entry area portion, wherein at least one information means area of the apparatus is adapted to accept machine readable identification means indicia.

Still yet another further object of this invention is the provision of a publication reference-aid system apparatus wherein the "production-assembled" apparatus is an improvement for publications and an improvement over prior index systems as a reference-aid apparatus for paginated and non-paginated publications such as periodicals, compact and floppy discs, music record albums, cassette tapes of all types and other manufactured publications of variety which are collected and stored enhancing the usability of the publication means.

Yet still a further object of this invention is the provision of a publication reference-aid system apparatus wherein the releasably protective covering means is integrally formed from and hingedly connected to the sheet means comprising the covering means being folded over along the foldable line means releasably adjoining the inferior adhesive to facilitate the application of the covering means.

These and further objects and advantages of this invention are apparent in the disclosure and will be best understood in the following detailed specification, drawings and claims.

BRIEF DESCRIPTIONS OF THE DRAWINGS

Figure 16:
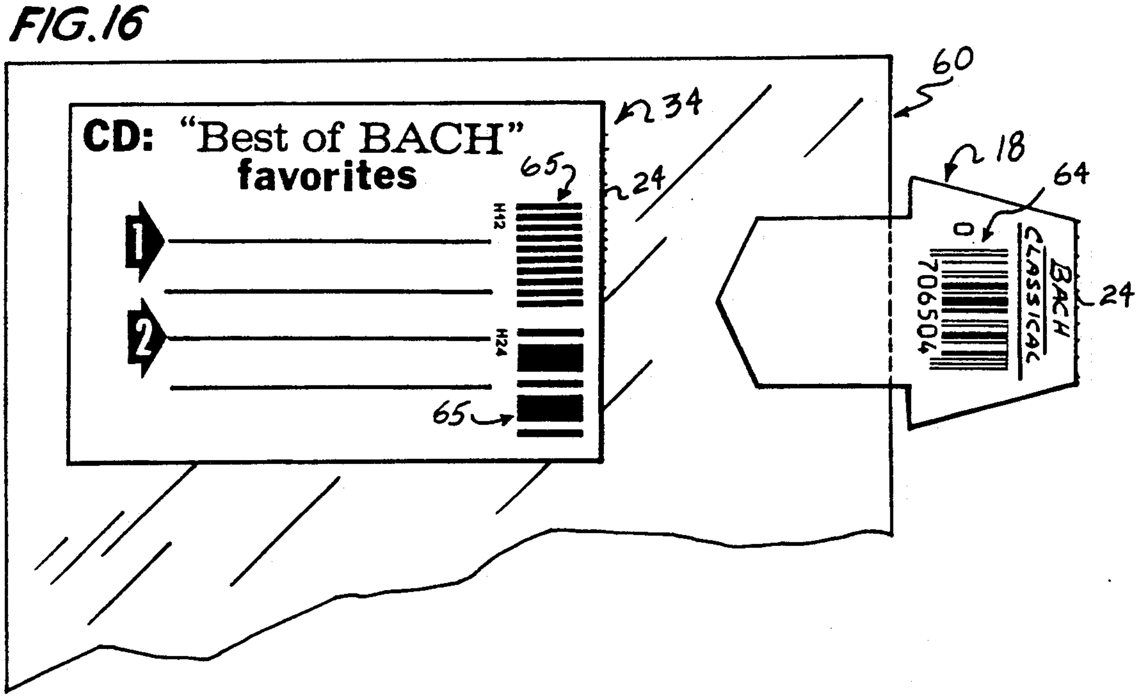
Figure 17:
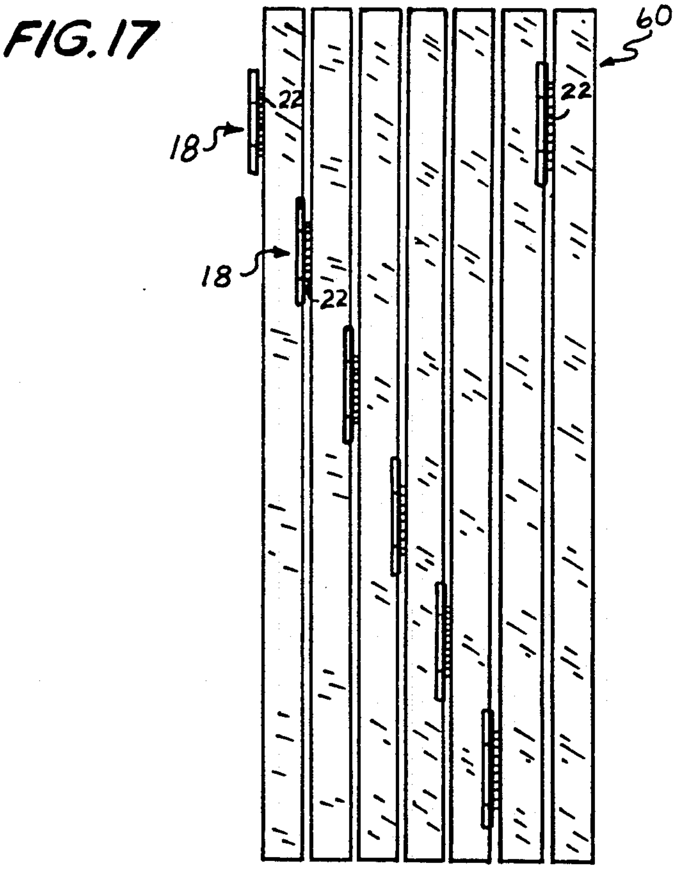

FIG. 16 is a fragmentary plan view of a compact disc dust-cover cover container showing one assigned marker to identify the publication in use; at least one machine readable identification indicia; and, the marker having a modified geometric shape; and, FIG. 17 shows a preferred embodiment of the markers in series arranged in consecutive placement pattern to inventory and retrieve the publication of FIG. 16 when filed juxtaposed in a storage receptacle.

FIGS. 18, 19, 20 and 21 are generally schematic, prespective views illustrating possible production methods and apparatus.

DETAILED DESCRIPTION OF THE DRAWINGS

Figure 1:
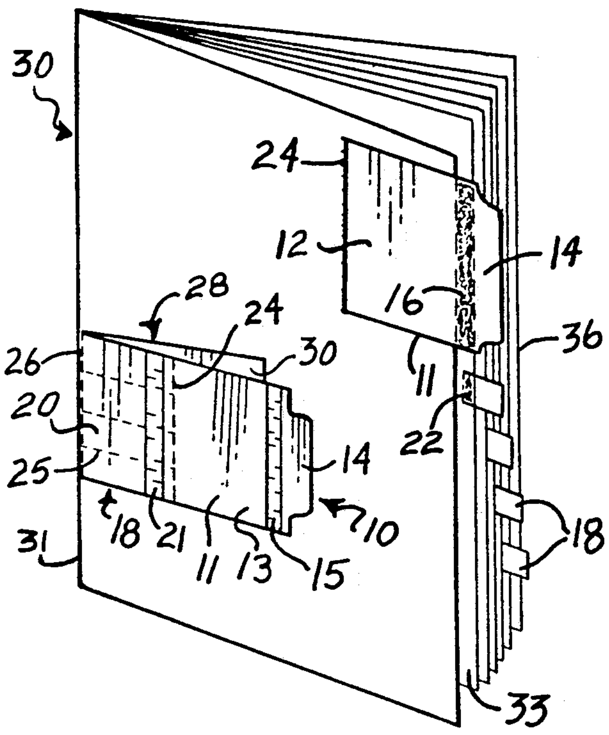
FIG. 1 is a perspective view of a paginated publication type showing the separably removable and mountable apparatus temporarily secured as a convenient reference-aid therewith, the primary and secondary markers having been removed and mounted to the selected pages.
Figure 2:
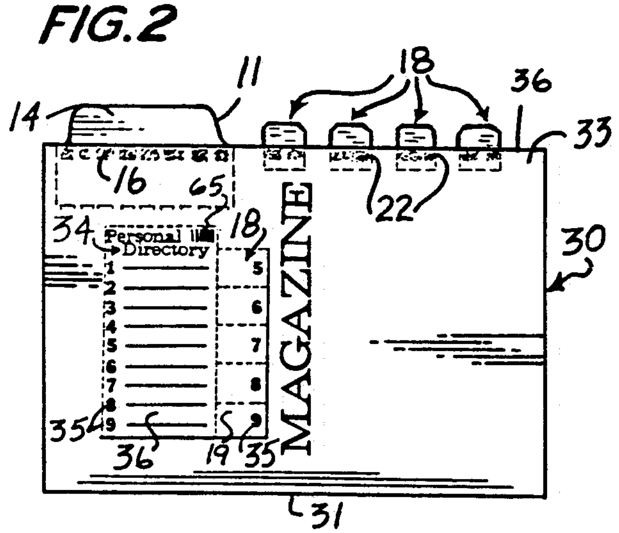
FIG. 2 is an elevational view of the publication type shown in FIG. 1, showing the apparatus members separated and mounted to a publication, prepared for file.

In accordance with this invention, a separably removable reference-aid apparatus 10 is assembled with a publication 30 at the time of manufacture, the publication being of various types—paginated and non-paginated—for example, a magazine periodical 30 shown in FIGS. 1 and 2; the compact disc container 60, viewed in FIGS. 16 and 17. The reference-aid apparatus 10 is constructed from double-faced flexible sheet stock material which may be of paper, mylar, plastic, vinyl or any material suitable for this intended use. The production assembled reference-aid apparatus may be constructed from at least one sheet of material of the publication. As illustrated in views, FIGS. 3, 10, 11, 12, 14 and 16, such sheet is shown to be divided into one or more apparatus marker members by means of one or more separable lines, 24, 25 and 26 as indicated in the embodiment, depending upon application and design.

Figure 3:
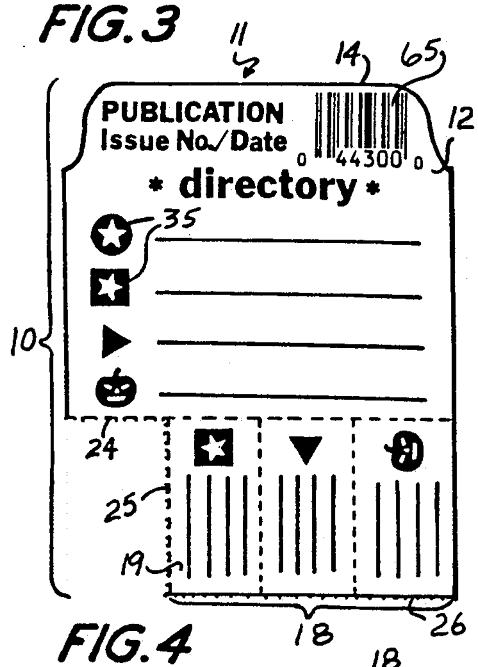
FIG. 3 is a plan view of the reference-aid apparatus showing a secondary marker removed from separable lines.
Figure 4:
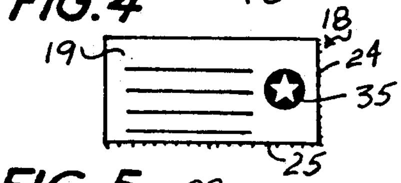
FIG. 4 is a plan view of one face of the index marker detached from the parent reference-aid apparatus of FIG. 3.

FIG. 3 shows basically an embodiment of one apparatus arrangement having one member element separably removed from the parent apparatus. In this embodiment, the apparatus 10 consists of the primary marker member element 11 having a head tab 14 specifically designed for publication information, machine readable identification means indicia 65, etc. Both faces 12 and 13 of the primary marker being occupied substantially by the information means area which may be used to incorporate an imprinted directory on one face (the face without the adhesive.) As can be seen, the information means area is comprised of at least one inscribable entry area portion, and the inscribable entry area portion is comprised of at least one inscribable entry area where each cooperating inscribable entry area is identified by an adjacent identification means indicia 35. Further, each adjacent cooperating identification means indicia 35 corresponds to a "like" identification indicia shown to be below on one face 19 of the subordinate (secondary) markers 18 separably removable from the parent sheet by lines 24 and 25. The secondary markers also have the information means area occupying substantially both faces 19 and 20. The adjacent cooperating identification means indicia may be variated to distinguish one entry area from another. Also, matched sets of identification means indicia comprise at least two "like" identification means indicia which reciprocally correspond in "cross-matched" cooperation with each other. Each of the matched sets of the identification means indicia being variated to differentiate groups of "like" identification means indicia from each other.

Figure 8:
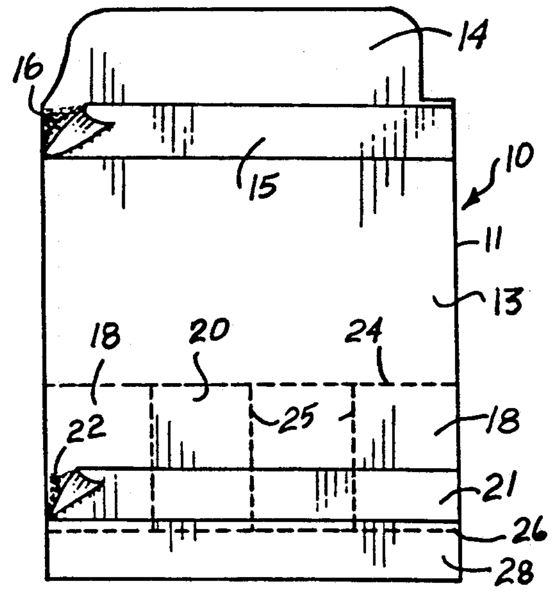
FIG. 8 is an elevational view of the opposite one face of the reference-aid apparatus showing the releasable protective covering means partially peeled away, further illustrating an example of a modification "lip" extension connected by a separable line means to the parent sheet.

FIG. 8 illustrates the opposite one face of the apparatus arrangement in FIG. 3 having a "lip" portion 28 temporarily secured by a separable line 26. This one face 13,20 of each of the apparatus members is occupied substantially by the information means area on which the attaching means area portion occupied by adhesive 16 and 22 overlies the information means area. The attaching means area may be less than or greater than one-half of the marker depending upon the designer involved. Further, the attaching means area portion is comprised of at least one attaching means area, for example, which may be decorated with adhesive graphic images, perhaps in a pattern. Regardless of the number of attaching areas employed, the sum total of the attaching means area is from about 2% to about 99.9% of the information means area on one face of the apparatus member. In addition, at least one attaching means area is overlayed with the releasable covering means. The releasably protective covering means 15, 21 multiple-faced and intermittently severed to allow complete separation of the apparatus members permitting individual removal from selected members. At least one edge of the protective covering 15 and 21 extends beyond the adhesive 16 and 22 beneath to facilitate removal of the covering means from the adhesive means, shown in FIGS. 3, 8 and 13. The covering means may be decorated by being adapted to be imprinted on at least one face.

Figure 9:
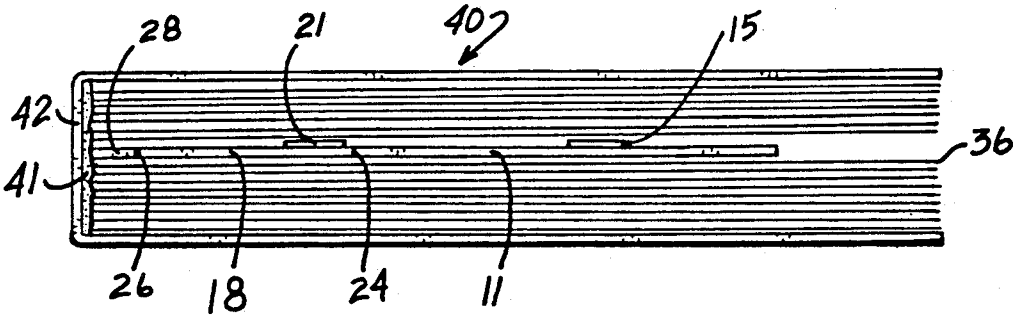
FIG. 9 is a top plan view of a perfect bound publication type with the apparatus of FIG. 8 temporarily secured therein.

FIGS. 1 and 9 illustrate the apparatus collated with a paginated publication means as a supplemented insert temporarily secured within, ready for distribution to the user who will separably remove and mount the desired apparatus members to the publication means as an aid to later access and retrieve the publication information. FIG. 1 shows the apparatus temporarily secured to the spine area 31 of a saddle-stitched publication 30; FIG. 9 further shows the apparatus perfectly bound (glued-in) by the "lip" portion 28 fixated with glue 41 permanently to the spine portion 42 of the publication (paginated type); Both FIGS. 1 and 9 illustrating the apparatus separably removable from a separable line 26.

Figure 10:
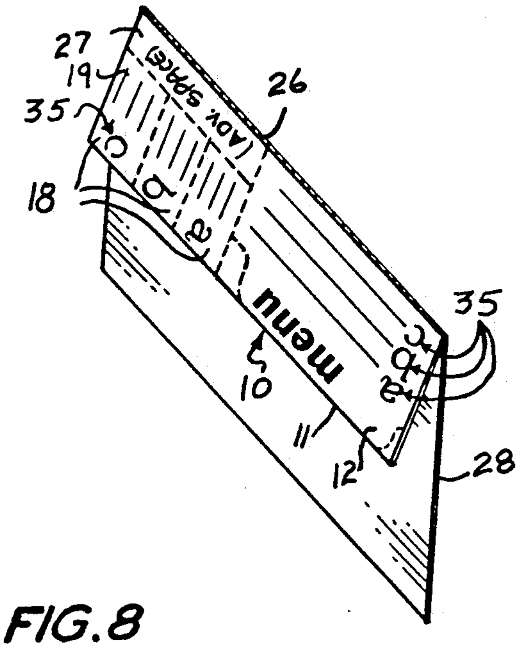
FIG. 10 is another perspective view showing an insert supplement sheet incorporating the apparatus as an alternate embodiment, the apparatus separably removable from a "hanger" panel portion.
Figure 11:
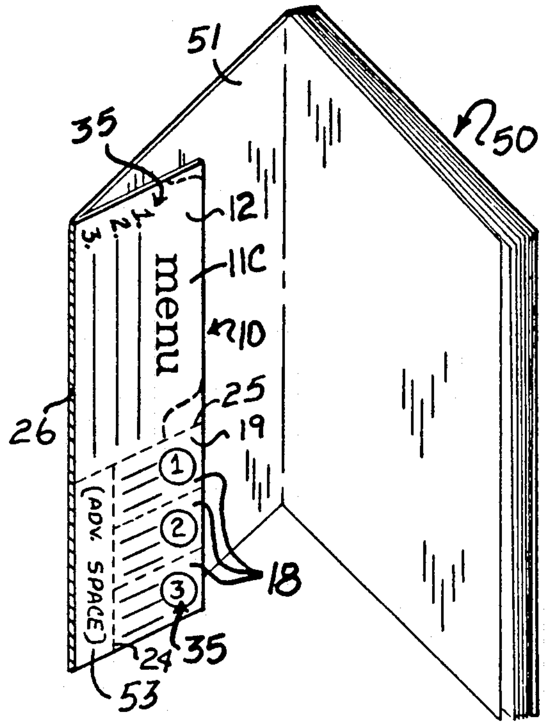
FIG. 11 is still another perspective view of a paginated publication showing the apparatus as an integral part of a gate fold panel being separably removable therefrom illustrating another embodiment.

The embodiments shown in FIGS. 10, 11, 12 and 14 illustrate other arrangements of the apparatus members as well as selections of the desired apparatus members to be employed. For example, FIG. 10 shows a variated arrangement of the apparatus being constructed from a "hanger-like" panel portion 27 of a sheet 28 separably removable along separable lines 24, 25, 26, etc. FIG. 11 shows a similar panel portion to that of FIG. 10 with the apparatus 10 formed as a part of the gate fold panel portion 53 of a panel leaf 51 permanently secured to a paginated publication 50, the apparatus being temporarily secured and separably removable by separable line 24, 25, 26. In the alternative, the apparatus 10 shown in FIGS. 3 and 8 for example, may be disposed inwardly between the adjacent pages as a form of securement. Further, the apparatus may lie between the pages to be adhesively secured temporarily (substituting the page for a covering means)—thus SAVING a manufacturing operation. In the case of a non-paginated publication, the apparatus, such as the one shown in FIG. 16 may be enclosed freely with the publication packaging or perhaps formed from a supplement sheet included within.

Figure 12:
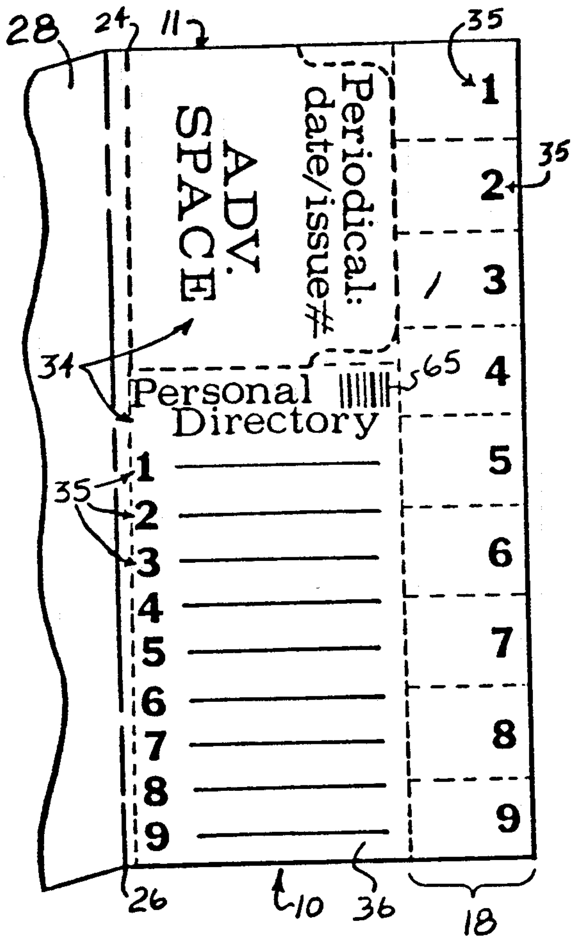
FIGS. 12 and 13 show front and rear views of the apparatus arranged in different format, illustrating the removably mountable directory remote from the marker members.
Figure 14:
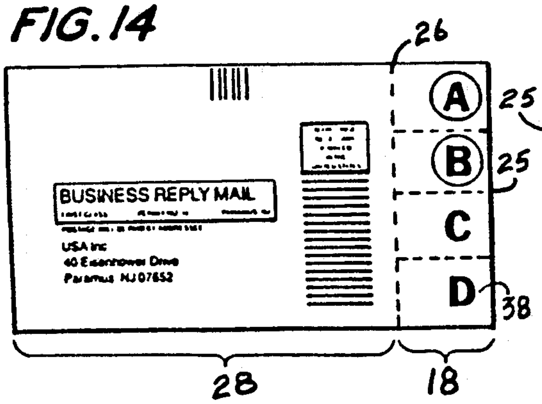
FIGS. 14 and 15 show front and rear views of at least one marker separably removable by at least one separable line means from an insert supplement.
Figure 15:
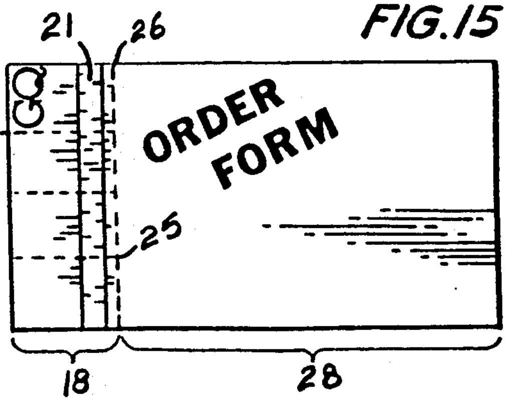

The primary and secondary markers 11 and 18, respectively, may be used in cooperation with each other as shown in FIG. 3 or be in cooperation with a separably mountable directory 34 viewed in FIG. 12 or be "non-cooperating" indicia 38, FIG. 14 to one another by the selected identification means indicia employed. It is required, with the present invention, that at least one information means area of the apparatus employed have at least one identification means indicia, FIG. 15, i.e., to indicate the publication and/or an advertising logo 65 sponsor, bar/color-code indicia, trademark, legend, etc.

For practical purposes, the apparatus members used in practice may be substantially rectangular configurations or perhaps substantially geometrical, as seen in FIGS. 3, 12, 14; modified geometrical shapes as seen in FIGS. 2 and 16; or irregular shapes, like animated characters and the like which may also be employed depending upon user market. The size of the mountable directory and the markers may vary substantially. The marker may have, for example, dimensions of length and width of 1½ inches by ⅞ inch or vise versa. The designer may choose to have a fraction of the marker extend beyond and overlie the edge of the publication; should this occur the attaching means area portion on the opposite face might need to overlie approximately 95% of the information means area which substantially occupies the one face, as an example.

In the case of the non-paginated publication variety, only one marker may be required to accompany the manufactured publication, as shown in FIG. 16, which may be assigned to identify the particular publication using bar codes 64, 65 trademarks, etc. and/or perhaps an inscribable entry area provided, if desired, to indicate the compact disc selection, music record album, cassette tape, diskette to be reviewed. Even with this variation shown, the designer may warrant the employment of at least one information means area of apparatus to be adapted to accept machine readable indentification means indicia, being read either magnetically, electrically or otherwise.

Should any one or all the apparatus members be employed as a production assembled unit, at least one member is temporarily secured as a convenient reference-aid with the publication means during the time of manufacture, making the apparatus readily adapted to be separably removable from the publication means and mountable thereon by a user.

The apparatus incorporates the use of substantially transparent inferior adhesive adapted to be colored which occupies the attaching means area portion. The adhesive, permanently affixed the apparatus sheet, may be positioned substantially perpendicular, transversely or otherwise across the face of the apparatus members, perhaps occupying one or more attaching means areas decorated with adhesive graphic images. The attaching means area portion may overlie the information means area by less than or greater than substantially one-half of the apparatus member face depending upon the designer. The proportionate area size of the attaching means area to the information means area will determine the portion of the marker that will be extending beyond and overlying the edge of the publication means. The co-exisiting mentioned areas comprising one face of each member are a substantial improvement over the prior art, providing now greater design versatility and flexibility in layout formats. For instance, advertising may be imprinted on the entire one face of the apparatus member and lie beneath the substantially transparent adhesive substance 16, illustrated in FIG. 13. Due to the fact that the advertising space is increased (which includes the information means area beneath the substantially transparent adhesive occupying the attaching means area portion) the additional possibilities that may result are "unexpected" from a creative standpoint and are broadened substantially by the mere aspect of this inherent feature.

Figure 13:
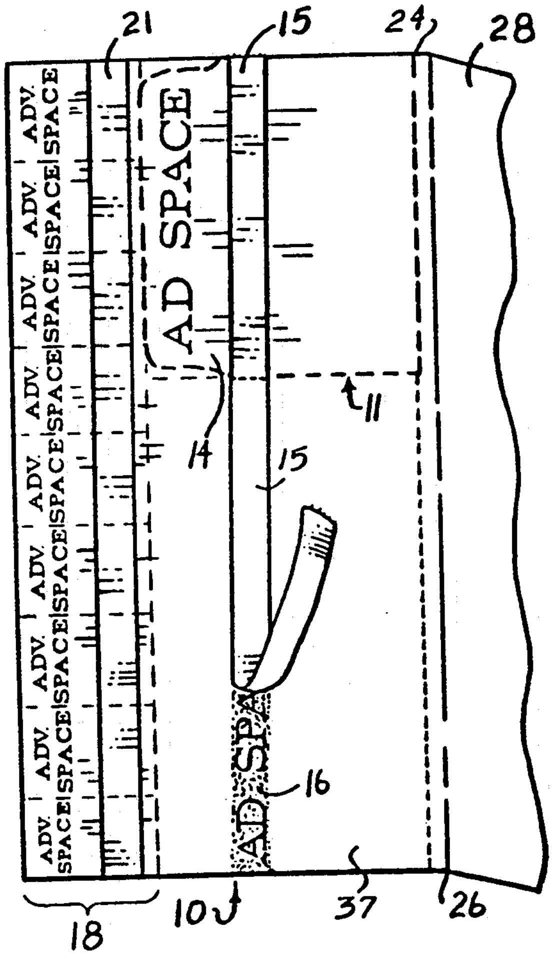

The intermittently severed protective covering 15, 21 (without a release coating means) as shown in FIGS. 8 and 13 is adapted to be imprinted on at least one face and at least one edge of the covering means extends beyond the adhesive beneath to facilitate removal of the covering means 15 and 21 from the adhesive substance 16 and 22. Further, a number of coverings may be employed, taking on various shapes, i.e., circles, stars, squares or any other shape and may be individually applied to at least one attaching means area occupied by adhesive, illustrated in FIG. 20.

Figure 6:
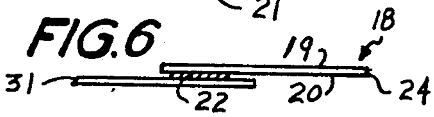
FIG. 6 is a fragmentary edge view of the index marker of FIG. 5 mounted to the outside margin of a publication, extending beyond and overlying the edge thereof.
Figure 7:
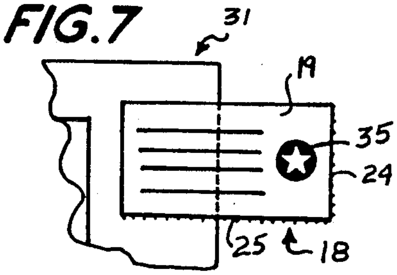
FIG. 7 is a fragmentary plan view showing an apparatus marker adhesively mounted to the outside margin of a publication, showing the "cross-matched" identification indicia adjacent the inscribable entry area comprising the entry area portion which overlies the information means area substantially occupying one face.

Upon separation of the desired apparatus members 11, 18 and/or 34, the covering means is removed exposing the adhesive means and revealing the graphic image thereunder, imprinted to the face of the sheet as illustrated in FIG. 13. The apparatus is separably removable from its parent publication, individually separated (including the covering) the covering removed and mounted to the outside margin of the publication from whence it came, the marker portion extending beyond and overlying the edge as can be seen in FIGS. 6, 7 and 16. Should a lottery game, for example, be employed with the apparatus members, the coverings 16 and 21 (which may be opaque) may conceal the numbers beneath the substantially transparent adhesive until the covering is peeled away to reveal the information, game, advertising and the like. The designer may like to use a substantially transparent covering means, as an alternative, to create a further desired effect.

Once the apparatus member or members are mounted appropriately to their parent publication from whence they came, they provide simplicity and ease when relocating and inventorying numerous publications of a particular type that are placed juxtaposed in storage. FIG. 17 illustrates a series of markers in consecutive arrangement identifying each compact disc selection without having to remove each publication, unnecessarily, from its filed position in storage for visual or machine reading purposes.

Figure 5:
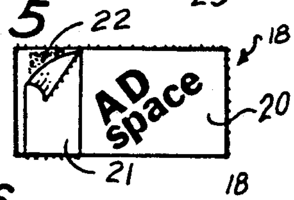
FIG. 5 is a plan view of the opposite one face of the page index marker in FIG. 4, showing the releasable protective covering means partially peeled away exposing the adhesive means beneath occupying the attaching means area portion which overlies the information means area.
Figures 18, 19, 20:
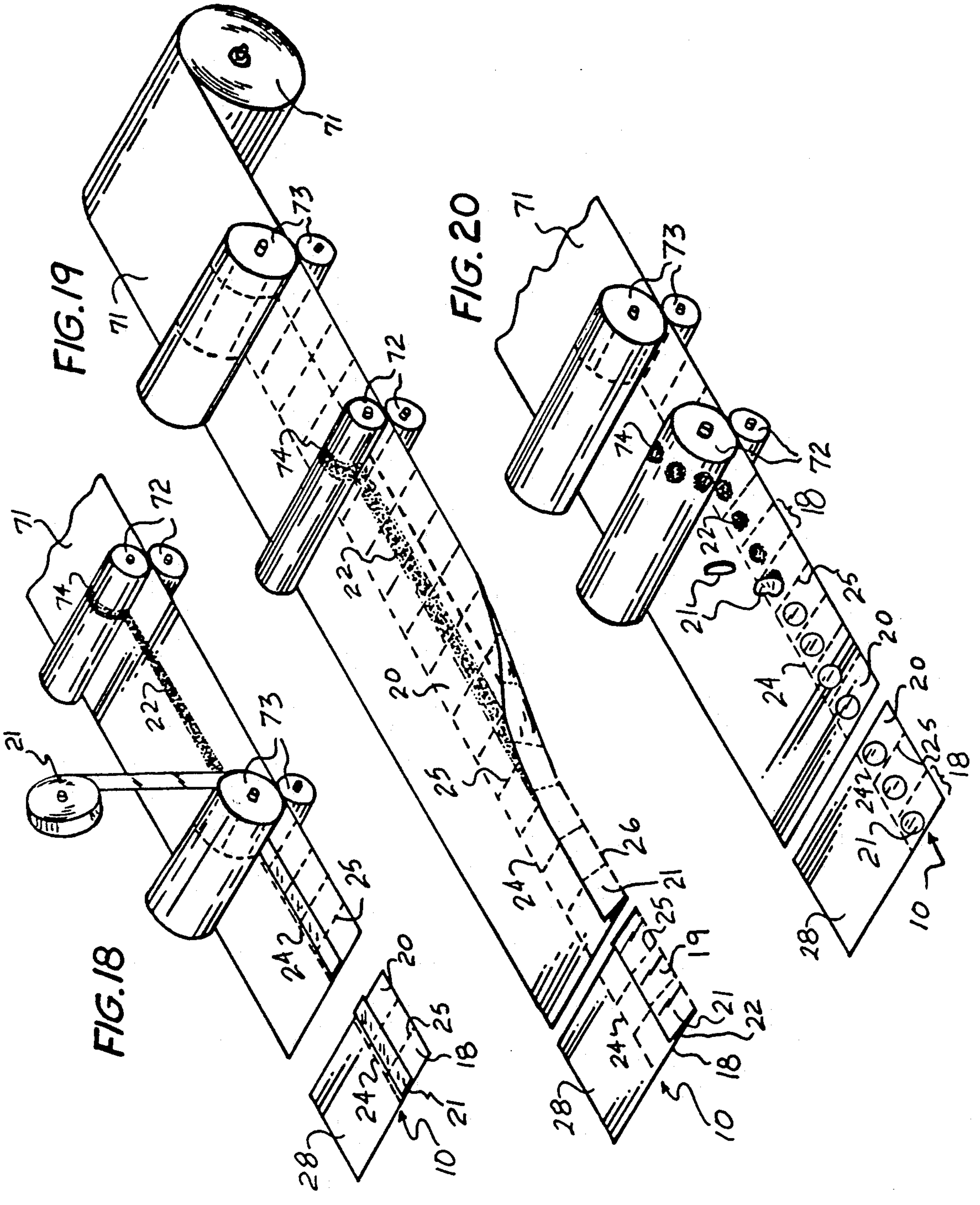

The protective covering means may be applied to the apparatus, whereby both elements maybe perforated or the like, concurrently during the fabrication process shown in FIG. 18. In the alternative, the releasably protective covering means may be applied following fabrication of the apparatus from the sheet stock, the covering means then being intermittently severed as applied (possibly by a programable tape dispenser) to correspond with the pre-existing separable lines on the sheet in approximate alignment, permitting complete separation of the individual apparatus members and their adjoined respective covering, shown in FIG. 5 with the covering means partially removed exposing the adhesive beneath. Employment of the intermittently severed releasably protective covering means may not only be beneficial to allow complete separation of the selected apparatus member, it also eliminates the need to tear or rip the covering during individual member separation as well as providing a means to separate each fabricated apparatus entity from another during the operation of manufacturing when the covering means is being applied.

In another production method, the releasably protective covering means 15, 21 may be integrally formed from and hingedly connected to the sheet material comprising the apparatus 10 which is the folded over along the foldable line means releasably adjoining the inferior adhesive 16, 22 to facilitate the application of the covering means thereby eliminating the need for a separate protective covering to be applied to the apparatus face illustrated in FIG. 19. (for "in-line" production)

Figure 21:
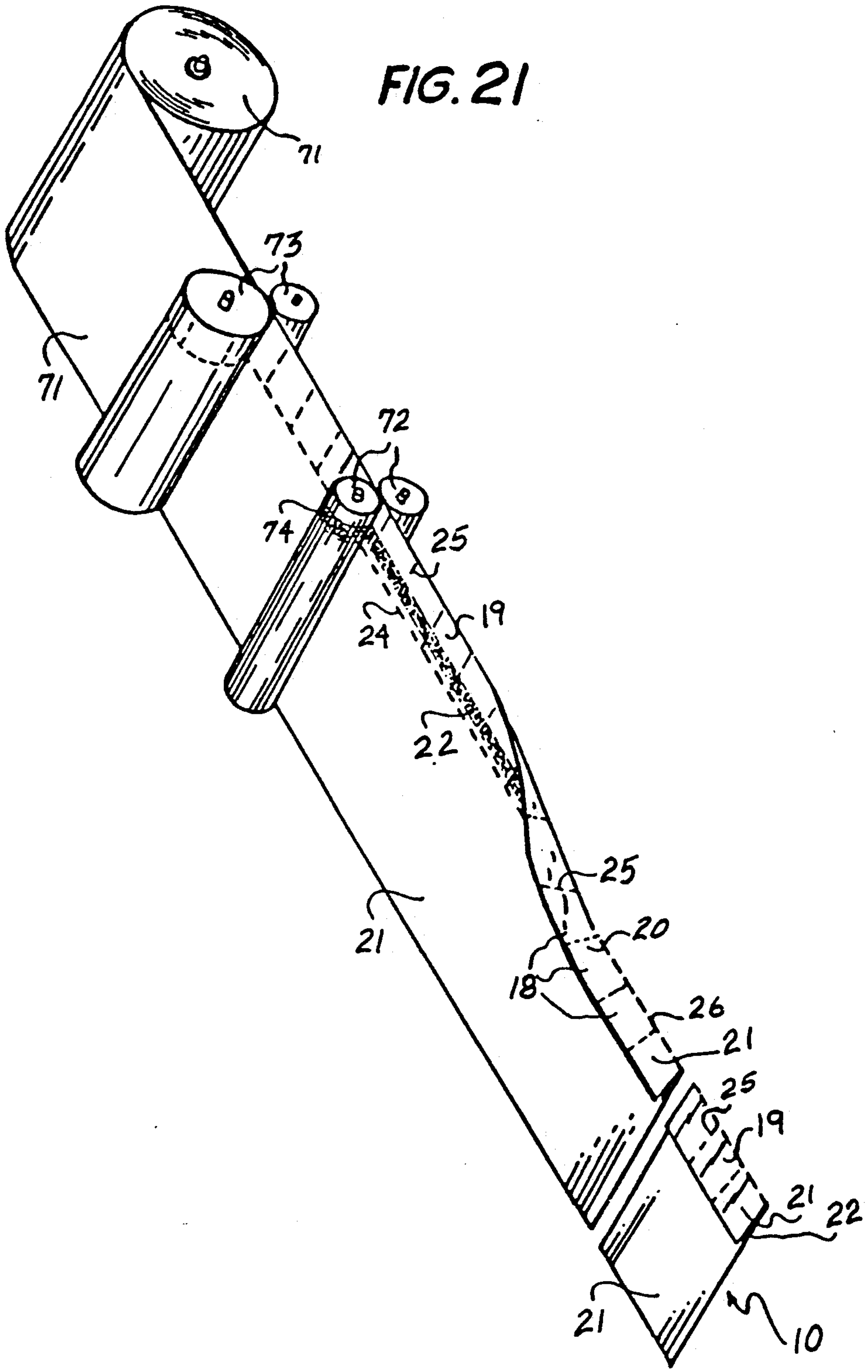

The apparatus of this invention aforesaid can be mass produced by passing the sheet material 71 from a roll or from a single sheet (sheet fed) under various press stations fulfilling different functions in the fabrication of the apparatus. FIGS. 19 and 21 demonstrate examples of high volume "in-line" methods of manufacture and of adjoining the releasably protective covering means 21 hingedly connected to the sheet stock material 71. FIG. 19 shows the apparatus 10 folded over along a foldable line means (which also may be a separable line 26). The hingedly connected and integrally formed covering 21 being folded over concealing the adhesive image 74; the adhesive image being permanently applied to the one face of the apparatus 10. The apparatus 10 is formed by separable line means 24, 25, 26 between the press rollers 73 at one station. At the next station, the adhesive substance 22 is applied as an image 74 by the press rollers 72 to the designated attaching (affixing) means area which overlies the information means area of the apparatus 10. Thereafter, the covering means 21 is folded over the inferior adhesive 22 to protect it until use; the apparatus and covering being intermittently severed from the sheet material 71 and included with the publication during the manufacturing process. FIG. 21 shows an alternative method, where the apparatus 10 has the adhesive means 22 being permanently applied as an image 74 by press rollers 72 to one face of the sheet after being formed by press rollers 73; the apparatus shown here as a series of markers 18 being folded over along the foldable line means 26 onto the hingedly connected parent sheet covering 21. The apparatus 10 and sheet being intermittently severed from the sheet material 71.

Another method of production designed for "off-line" shorter production runs would be applying the adhesive substance 22 (in this case) by press rollers 72 as an image 74 permanently applied to one face of the apparatus 10. At least one releasably protective covering means 21 (shown) may be applied; the covering means being intermittently severed concurrently with the sheet material 71 at the station of press rollers 73 forming the apparatus 10 (consisting of only members 18 in this example) illustrated in FIG. 18. In FIG. 20 the sheet material 71 is shown to pass through press rollers 73 which integrally forms the apparatus 10 (members 18 only shown); the sheet material continuing to pass through the second station between press rollers 72 which apply the adhesive image 74 (shown to be a circular-shaped image) the adhesive substance 22 permanently applied to the attaching means area which overlies the information means area of the apparatus 10. Intermittently severed coverings are independently adjoined to the adhesive substance 22. The apparatus is severed from the sheet to be included with the publication during manufacture.

In use of this invention, a method of employing a reference-aid apparatus for use with its parent publication to retrieve and access the information found in the publication using the apparatus comprising the steps of (a) separably removing the production-assembled apparatus temporarily secured with a publication means; (b) further separating the selected apparatus members to be employed on the publication; (c) hand writing personal notations on the inscribable entry areas where provided; (d) peeling away the intermittently severed releasably protective covering extending beyond the substantially transparent inferior adhesive beneath to facilitate removal of the covering means from the adhesive means; (e) mounting the selected marker to the outside margin of the publication means extending beyond and overlying the edge, the separably mountable directory being mounted to a panel of the publication means; (f) cross-matching sets of "like" identification means indicia having reciprocally corresponding relationship to each other; (g) employing the information means area on one face of the apparatus which is adapted to accept machine and visually readable identification means indicia to expedite the retrieval and access of required information found in the publication means.

In this manner of function, inventory control capabilities may be employed along with ease in visually accessing and retrieving the desired publication in an expedient method with fewer hand motions required to relocate wanted publication material which is to found.

The improved reference-aid offers additional features as well as "unexpected" information areas which are overlied in part by the attaching (affixing) means area portion to be exploited by designers as advantages over prior art systems which also provide special advantages to publishers, advertising sponsors and designers of the apparatus as a promotional tool.

The present invention enhances the usefulness of publications and is practical as well as complementary to the function of both "index listings" and "table of contents", if provided, depending on the type of publication which includes the apparatus. The included apparatus with a publication during manufacturing increases the "information value" of the publication product to a user.

Accordingly, while example embodiments of this invention have been described and illustrated for the purpose of clarity and understanding, the invention should not be considered limited as variations and modifications will be obvious to those skilled in the art without departing from the spirit and scope of the present invention as set forth in the appended claims.

What I claim is:

1. A reference-aid apparatus adapted for use with and temporary securement to a publication, said apparatus comprising:

a substrate formed of sheet stock, said substrate comprising a primary marker member and at least one secondary marker member with said at least one secondary marker member being releasably attached to said primary marker member by a line of separations;

said primary marker member further comprising a head tab portion with said portion being adapted to receive first indicia thereon for identifying a publication, said primary marker member further comprising on one face thereof a directory area with said directory area having second indicia thereon defining at least one inscribable entry area with third indicia located adjacent to and being specific to each of the said at least one inscribable areas on said primary marker member, the other face of said primary marker member comprising an attaching means area with a releasable and reusable pressure sensitive adhesive permanently attached thereto and covered by a removable protective sheet;

said at least one secondary marker member containing on one face thereof fourth indicia defining at least one inscribable entry area thereon with fifth indicia located adjacent to and being specific to each of the said at least one inscribable entry areas on said secondary marker member, the other face of said secondary marker member comprising an attaching means area with a releasable and reusable pressure sensitive adhesive permanently attached thereto and covered by a removable protective sheet; and said third and fifth indicia having a predetermined associative relationship.

2. A reference-aid of claim 1 wherein said substrate comprising said primary marker member being releasably attached to a portion of said substrate by at least one line of separations.

3. A reference-aid of claim 1 wherein said substrate comprising said at least one secondary marker member being releasably attached to a portion of said substrate by at least one line of separations.

4. A reference-aid of claim 1 wherein said primary marker member is without a head tab portion and said directory area being adapted to receive first indicia thereon for identifying a publication.

5. A reference-aid of claim 1 wherein said substrate comprising only said primary marker member.

6. A reference-aid of claim 1 wherein said substrate comprising only said at least one secondary marker member.

7. A reference-aid apparatus adapted for use with and temporary securement to a publication, said apparatus comprising:

a substrate formed of sheet stock, said substrate comprising a primary marker member and at least one substrate portion with said primary marker member being releasably attached to said substrate portion by at least one line of separations;

said primary marker member further comprising a head tab portion with said portion being adapted to receive first indicia thereon for identifying a publication, said primary member further comprising on one face thereof a directory area with said directory area having second indicia thereon defining at least one inscribable entry area with third indicia located adjacent to and being specific to each of the said at least one inscribable entry areas on said primary marker member, the other face of said primary marker member comprising an attaching means area with a releasable and reusable pressure sensitive adhesive permanently attached thereto and covered by a removable protective sheet; and said first and third indicia having a predetermined associative relationship.

8. A reference-aid of claim 7 wherein said substrate comprising only said primary marker member.

9. A reference-aid of claim 7 wherein said primary marker member is without a head tab portion and said directory area being adapted to receive first indicia thereon for identifying a publication.

10. A reference-aid of claim 7 wherein said second and third indicia having a predetermined associative relationship with first indicia.

11. A reference-aid apparatus adapted for use with and temporary securement to a publication, said apparatus comprising:

a substrate formed of sheet stock, said substrate comprising at least one marker member and at least one substrate portion with said at least one marker member being releasably attached to said substrate portion by at least one line of separations;

said at least one marker member containing on one face thereof first indicia defining at least one inscribable entry area thereon with second indicia located adjacent to and being specific to each of the said at least one inscribable entry areas on said marker member, the other face of said at least one marker member comprising an attaching means area with a releasable and reusable pressure sensitive adhesive permanently attached thereto and covered by a removable protective sheet; and said first and second indicia having a predetermined associative relationship.

12. A reference-aid of claim 11 wherein said at least one substrate portion comprising a directory area on one face thereof adapted to receive third indicia thereon having a predetermined associative relationship with said first indicia and said second indicia of said marker member and said third indicia defining at least one inscribable entry area with forth indicia located adjacent to and being specific to each of the said at least one inscribable entry areas on said directory area.

13. A reference-aid of claim 12 wherein the other face of said substrate portion comprising an attaching means area with a releasable and reusable pressure sensitive adhesive permanently attached thereto and covered by a removable protective sheet.

14. A reference-aid of claim 11 wherein said substrate comprising said at least one marker member.

* * * * *